Feb. 1, 1949.  O. R. HAAS  2,460,384
GUN LOADING MECHANISM
Filed May 25, 1944  10 Sheets-Sheet 1

Fig. 1.

Inventor
Otto R. Haas
By his Attorney

Inventor
Otto R. Haas
By his Attorney

Inventor
Otto R. Haas
By his Attorney

Fig. 6.

Feb. 1, 1949.  O. R. HAAS  2,460,384
GUN LOADING MECHANISM
Filed May 25, 1944  10 Sheets-Sheet 7

Inventor
Otto R. Haas
By his Attorney

Fig.14.

Inventor
Otto R. Haas
By his Attorney

Inventor
Otto R. Haas
By his Attorney

| Main Cam Shaft | 10 20 30 40 50 60 70 80 90 100 110 120 130 140 150 160 170 180 190 200 210 220 230 240 250 260 270 280 290 300 310 320 330 340 350 | | | | | |
|---|---|---|---|---|---|---|
| Indexing Drive | At Rest | Rounds Indexed | | | | At Rest |
| Magazine Gate Cam | Gate Opens | Remains Open | Gate Closed | At Rest | | |
| Transfer Tray | At Rest | Tray Drops With Round | | Rest At Ramming Position | Tray Returns | Rest |
| Rammer | At Rest | | | Round Rammed | Rammer Returns | Rest |
| Rammer Tipping | At Rest Up Position | | Tipping Down In Back Of Round | Remains Down During Ramming | Tips Up To Clear Tray | At Rest Up Position |
| Safety Cam | Closed | Open | | | | Closed |

Inventor
Otto R. Haas
By his Attorney

Patented Feb. 1, 1949

2,460,384

UNITED STATES PATENT OFFICE 2,460,384

GUN-LOADING MECHANISM

Otto R. Haas, Beverly, Mass., assignor to United Shoe Machinery Corporation, Flemington, N. J., a corporation of New Jersey Application May 25, 1944, Serial No. 537,267

13 Claims. (Cl. 89—33)

This invention relates to mechanisms for automatically loading guns and more particularly to loading mechanisms for use with guns of large caliber.

The invention is illustrated herein as applied to a gun of large caliber designed for use in an airplane. One of the objects of the present invention is to provide an improved shell magazine for accommodating large shells to be fed therefrom to a gun. To this end and in accordance with a feature of the invention, the magazine provides a substantially continuous antifriction supporting surface for sustaining the weight of the shells as they are indexed in the magazine to a release station from which they are withdrawn to be fed into the gun. This supporting surface is illustrated as formed of a plurality of small rolls arranged in staggered relation over which shells pass as they are indexed through the magazine. In order to accommodate a large number of shells in the restricted space available in the nose of an airplane, the magazine is kidney shaped and is located above and to the rear of the gun and substantially concentric therewith. The magazine provides a pair of kidney-shaped tracks each of which is formed of a pair of members between which the shells are confined for movement, and shell-engaging members are positioned between each pair of shells and are interconnected and guided for movement in a path parallel to the path of movement of the shells thereby to index the shells in a step by step manner through the magazine.

The lower central portion of the magazine is provided with openings through which the shells may pass as they are transferred into ramming position in alinement with the bore of the gun. These openings are normally closed by gates which are opened at a predetermined time during the loading operation to permit a shell to pass from the magazine. In order that the shells may be retained in the magazine during a loading operation, provision is made for rendering the gate-moving means inoperative at this time with the gates in their closed positions.

The gun is fired at any desired time after it has been loaded by depressing a firing button. In accordance with a further feature of the invention, provision is made for preventing operation of the firing mechanism during a loading operation. To this end the firing mechanism is set into operation by the energization of a solenoid in the circuit of which is a switch which is opened during operation of the drive shaft by which the indexing, shell-transferring and loading mechanisms are operated. Accordingly, if the operator should prematurely press the firing button while the gun is being loaded the solenoid will not be energized to actuate the firing mechanism because this switch is open at this time.

The above and other features of the invention, including various novel combinations of parts and details of construction will now be more particularly described by reference to the accompanying drawings and thereafter pointed out in the claims.

The invention, as illustrated herein, is embodied in a shell feeding and loading mechanism applied to a large caliber gun 10 mounted in a frame 12, which, in the illustrated embodiment of the invention, is carried by the nose 14 of an airplane. The shells are supported in a magazine 16 in which they are fed in a step by step manner to a release station of the magazine from which they are transferred into ramming position in alinement with the bore of the gun and then rammed into the gun. The magazine is carried by a frame 18 comprising a pair of side frame members 20 supported at their forward portions on the trunnions 22 of the gun and by a support 24 at their rearward portions. The frame 18 also comprises a rear frame member 26 secured by screws 28 to the rear ends of the side frame members 20.

Figures 2, 3:
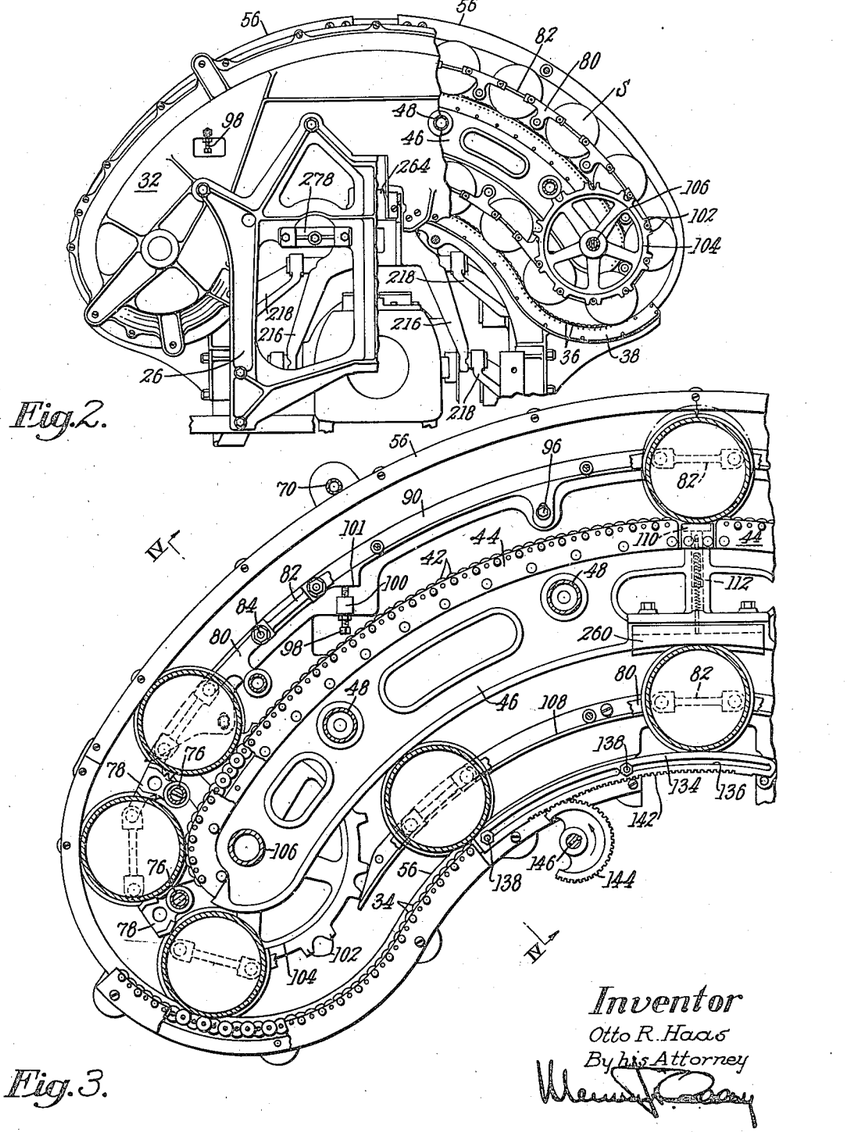
Fig. 2 is a rear elevation of the magazine, certain parts being broken away to illustrate the shell indexing mechanism.
Fig. 3 is a partial front elevation partly in section of the rear portion of the magazine, this view being on a larger scale than Fig. 2.

The shell magazine 16 comprises a forward wall 30 secured to and extending between intermediate portions of side frame members 20 and a rear wall 32 carried by the rear frame member 26. The front and rear walls of the magazine are generally kidney-shaped as illustrated in Fig. 2 and the shells are carried in the magazine as will be described, for movement in a kidney-shaped path. As shown in Fig. 2, the magazine is located above the gun and is generally concentric with the bore of the gun thereby to economize on the limited space available in the nose of the plane. The movement of the shells through a kidney-shaped path in the magazine makes it possible to use the maximum number of shells in the limited space.

Figure 4:
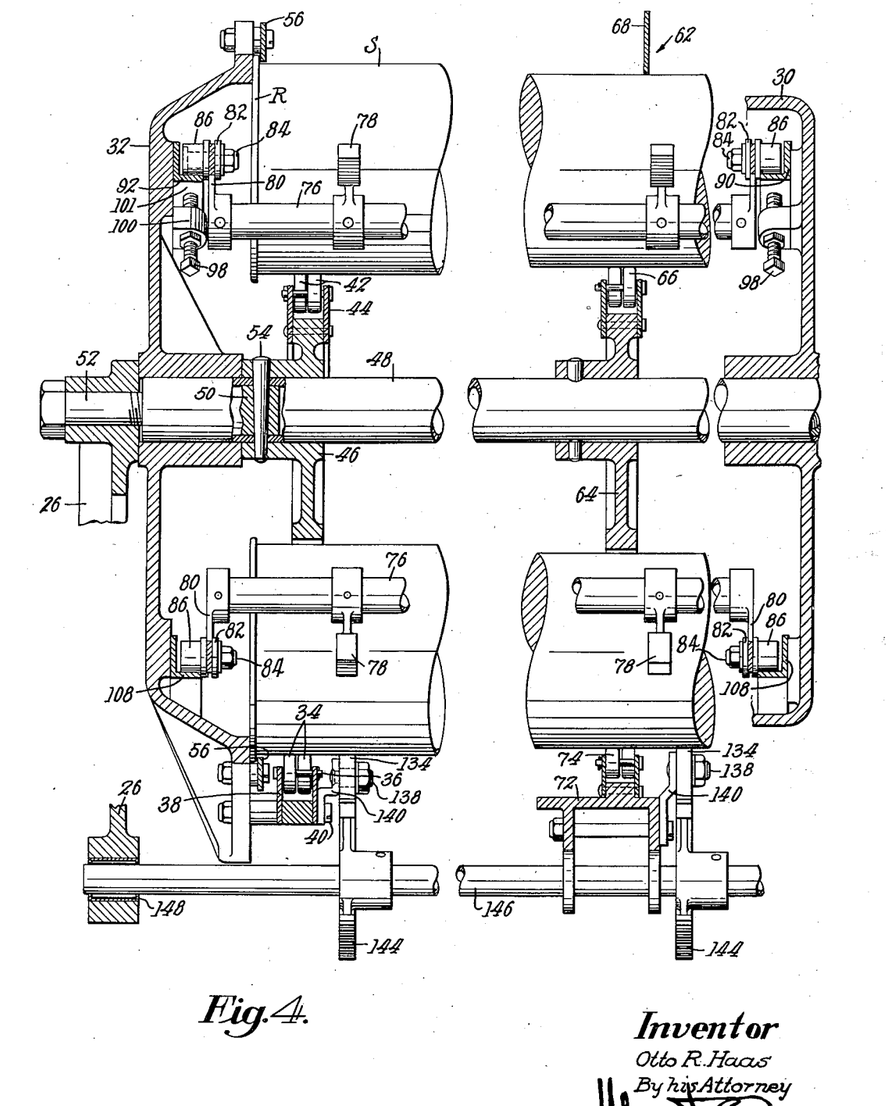
Fig. 4 is a section on the line IV—IV of Fig. 3.

The rearward ends of the shells are supported in the lower run of their path of movement by a track formed of a plurality of antifriction rolls 34, arranged in staggered relation as shown in Figs. 3 and 4 thereby to provide a substantially continuous antifriction surface. These rolls are carried by pins 36 (Fig. 4) supported by spaced plates 38 which are in turn carried by bolts 40 secured to and extending forwardly from the rearward wall 32 of the magazine. The upper run of the track is similarly formed of a plurality of antifriction rolls 42 arranged in staggered relation and carried between plates 44 which extend upwardly from a curved plate 46 (Fig. 3) which is carried by a plurality of supporting tubes 48 extending between the front and rear walls of the magazine. These tubes 48 also serve to connect the rear wall of the magazine to the rearward frame member 26. For this purpose threaded plugs 50 are fitted into the rearward ends of the tubes 48 and receive screws 52 passing through the frame member 26. Tapered pins 54 pass through a laterally extending flange of the plate 46, the tube 48 and the plug 50 thereby to secure the plate and the plug to the tube.

Extending around the periphery of the rear wall 32 of the magazine and spaced forwardly therefrom, is a series of plates 56 (Figs. 3 and 4) which form guideways for the rims R of the shells S to prevent axial movement of the shells relatively to the magazine. It will be noted from an inspection of Fig. 3 that the shells are supported throughout the upper run of their path of movement and through a large part of their lower run by the antifriction rolls 34 and 42, thereby to reduce the frictional resistance to their movement. In the upper run of the path the shells are supported between the rolls 42 carried by the plate 46 and the flange-guiding plates 56, and in their lower run between the rolls 34 and the lower edge of the plate 46.

Figure 1:
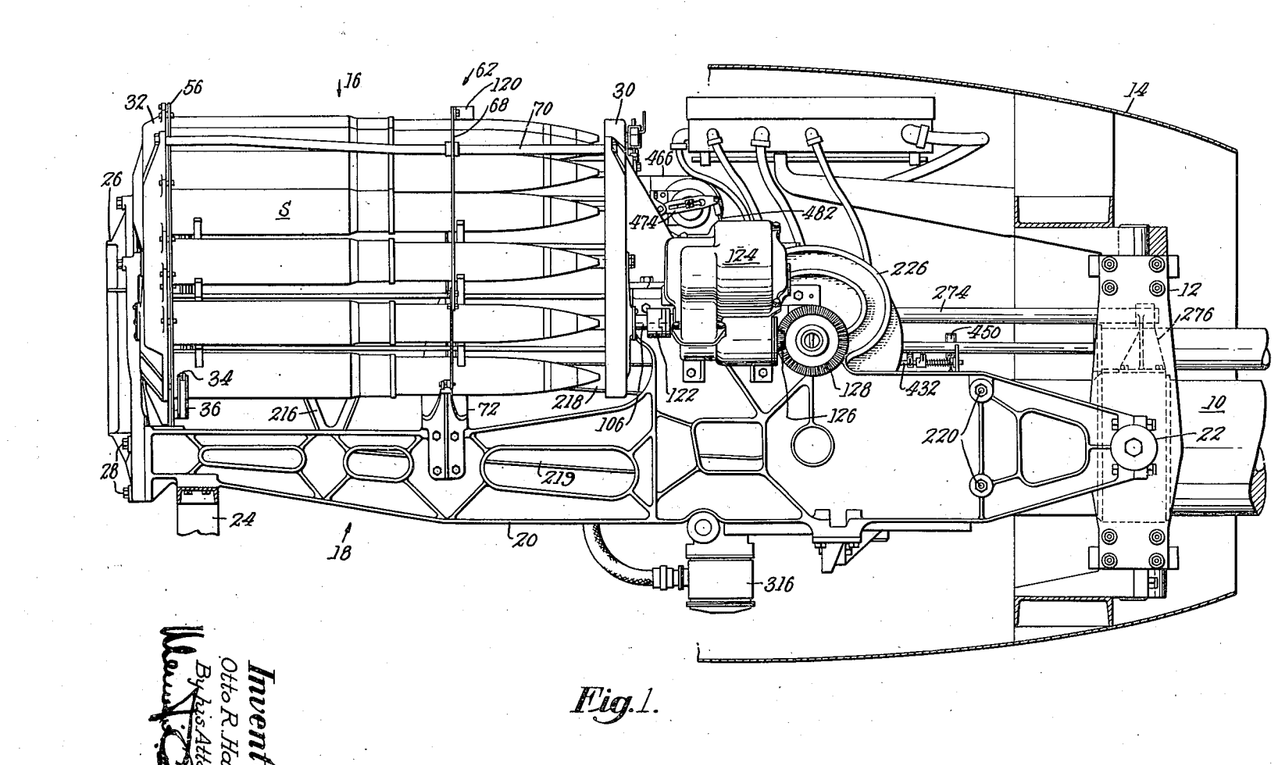
Fig. 1 is a side elevation of the shell magazine associated with the breech end of a gun.

The forward portions of the shells are guided for movement in a track 62 (Figs. 1 and 4). This track is formed of a central plate member 64 pinned to the tubes 48 and similar in construction to plate 46. Antifriction rolls 66 are carried by the upper portion of the plate to support the weight of the shells at their forward portions in the upper run of their path. To constrain the forward portions of the shells against movement upwardly from the rolls 66, a curved plate 68 surrounds the shells, this plate being carried by tubes 70 (Fig. 1), extending between the forward and rear walls 30 and 32 of the magazine. The lower ends of the plate 68 are secured to brackets 72 extending upwardly from the side frame members 20. These brackets extend inwardly toward each other below the shells in the lower run of the magazine and carry antifriction rolls 74 arranged substantially parallel to the rolls 34 of Fig. 3.

For indexing the shells around the magazine a rod 76 is positioned between each pair of shells, each of these rods carrying a pair of shell-engaging members 78 shaped as indicated in Fig. 3. These rods 76 have secured to their ends T-shaped arms 80, the outer ends of which are connected by links 82 to the adjacent T-shaped arms thereby to provide an endless chain. The links are connected to the arms 80 by pins 84 which carry rolls 86 (Fig. 4) arranged to ride on tracks 90, 92 carried by the front and rear walls 30, 32 of the magazine. These tracks are adjustably secured by screw and slot connections 96 (Fig. 3) to their supporting walls. Screws 98 threaded through bosses 100 carried by the walls engage shoulders 101 on the tracks to facilitate the accurate adjustment thereof. The tracks 90 and 92 terminate inwardly of the ends of the magazine to permit the rolls 86 to be received between teeth 102 of sprockets 104 carried by shafts 106 journaled between the front and rear walls of the magazine. These sprockets are driven in a step by step manner as will be later described, to operate the chains formed of the links 82 and arms 80 thereby carrying the rods 76 to move the shells in a step by step manner through the magazine. The lower run of the chains are supported by tracks 108 carried by the front and rear walls of the magazine.

In loading the magazine, the shells are inserted into the upper central portion thereof. In order to permit the shells to be inserted therein with the flange of the shells lying between the plate 56 (Fig. 14) and the rear wall 32 of the magazine, the plates 44 carrying the supporting rolls 42 (Fig. 3) terminate at opposite sides of the upper central portion of the plate 46 to provide a space therebetween. Mounted in the space thus formed is a depressible plunger 110 urged upwardly into shell supporting position by a spring 112 thereby normally to form a continuation of the track formed by the rolls 42. The plunger 110 includes a shank portion 114 (Fig. 14) slidable in a bore in the plate 46. When a shell is to be inserted in the magazine the nose is inserted between the plate 64 and the plate 68 and the rear end of the shell placed on the plunger 110. This plunger is depressed by force exerted on the back end of the shell until the flange of the shell is below the lower edge of the flange-engaging plate 56, whereupon the shell is moved rearwardly to carry the flange back of the plate 56 so that upon release of the shell the plunger 110 forces the shell into the position shown in Fig. 14.

In order to absorb the shock when the nose of the shell is inserted between the plates 64 and 68 a hardened metal insert 116 (Fig. 14) is provided in the plate 64 in place of the antifriction rolls 66 at this point. The plate 68, which normally constrains the forward portion of the shell against upward movement, is recessed at 118 to facilitate insertion of the shell between the plate 68 and the plate 64. In order to hold the shell in position after it has been inserted in the magazine, a forwardly extending bracket 120 is secured to the plate 68 and projects below the recessed portion of the plate 68 to engage the shell forwardly thereof.

Figure 5:
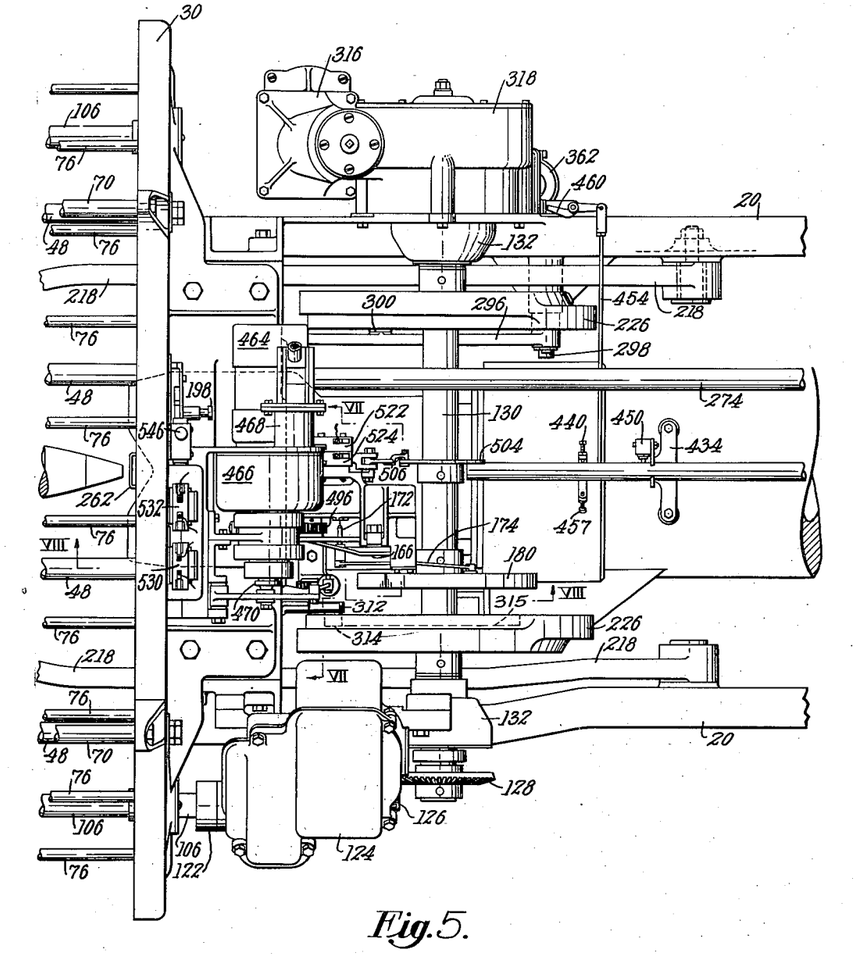
Fig. 5 is a plan view of the drive mechanisms by which the shells are indexed and loaded into the gun.

The indexing of the shells in the magazine is effected by intermittently driving the sprockets 104 through a distance sufficient to move a shell into position to be removed from the magazine. The shaft 106 carrying the sprockets at one side of the magazine, extends forwardly of the front wall 30 of the magazine (Figs. 1 and 5) and is connected by a coupling 122, a variable speed mechanism 124 and bevel gears 126, 128 to a cam shaft 130 journaled in bearings 132 in the side frame members 20. This cam shaft is driven intermittently by means to be described, thereby to cause an intermittent operation of the shaft 106. The variable speed mechanism 124 may be similar in construction to that illustrated in Letters Patent of the United States, No. 2,309,595, granted January 26, 1943, on an application filed in the name of L. E. James. Such a mechanism causes slow starting and stopping of the drive shaft 106 and rapid movement of the shaft between the starting and stopping portions of the cycle of operation.

The shells are removed from the magazine at a release station at the lower central portion, the tracks being interrupted at this portion of the magazine and gates 134 (Figs. 3 and 4) being provided for supporting the shells until that portion in the cycle of operations in which the shells are to be removed from the magazine. The gates 134 are formed of curved plates slotted at 136 to receive bolts 138 by which the gates are supported for sliding movement. These bolts are in turn carried by brackets 140, the bracket for the forward gate being carried by the bracket 72, whereas the bracket for the rearward gate is carried with the roll supporting plate 38. The under surfaces of the gates are provided with rack teeth 142 engageable with the gear segments 144 carried by a shaft 146 journaled in a bearing 148 in the rear frame member 26 and in bearings 150, 152 (Fig. 8) carried by a transverse frame member 154 secured to the side frame members 20. Upon movement of the segments in the direction of the arrow in Fig. 3, the gates are moved to the left to free the shell supported thereby for downward movement out of the magazine.

Figures 7, 8:
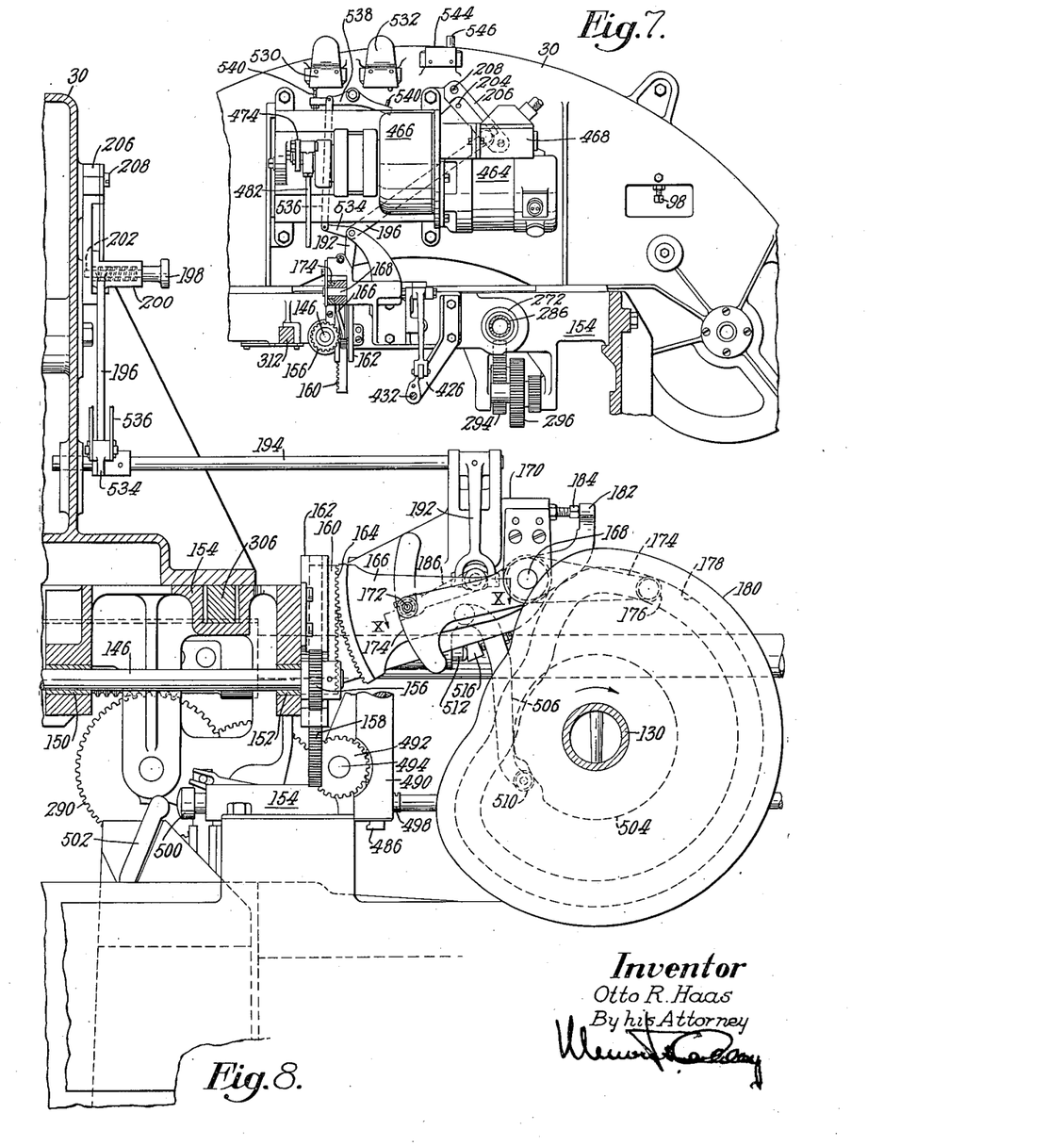
Fig. 7 is a section on the line VII—VII of Fig. 5.
Fig. 8 is a section on the line VIII—VIII of Fig. 5.

The shaft 146 is operated to open the gates 134 in timed relationship to the indexing movement of the shells in the magazine. The forward portion of the shaft 146 (Fig. 8) carries a pinion 156 engageable with teeth 158 of a rack 160 mounted for vertical movement in a guideway 162 secured to the front wall of the frame member 154. The rack 160 also has rack teeth 164 arranged for engagement by a gear segment 166, carried by a transversely extending shaft 168 in a forwardly extending bracket 170 secured to the frame member 154. The gear segment 166 is arranged to be connected during the normal operation of the apparatus by a pin 172 (Fig. 9) to the rearward end of a lever 174 carried by the shaft 168 and provided at its forward end with a cam roll 176 received in a groove 178 (Fig. 8) in the side of a cam 180 carried by the cam shaft 130. It will be noted that the cam track 178 is concentric with the shaft 130 through the greater portion of its length so that the gates are in their closed positions except for a short time only during a cycle of operations. During the loading of the magazine the gates must be maintained in their closed positions to prevent the shells dropping from the magazine at the release station. Accordingly, the gear segment 166 is disconnected from the lever 174 by moving the pin 172 out of engagement with the lever so that movement of the lever will not be imparted to the gear segment 166. In order to position the gear segment in its initial position as shown in Fig. 8, when it is disconnected from the lever 174, the segment is formed with an upwardly extending arm 182, engageable with a stop screw 184 threaded into the bracket 170.

The pin 172 is carried by one end of an arm 186, (Fig. 10) the other end of which carries a guide pin 188 slidable in a bore 190 in the bracket 170. Pivoted to the outer end of the pin 188 is an upwardly extending arm 192 (Fig. 8) the upper end of which is pinned to a forwardly and rearwardly extending shaft 194 to the rear end of which is pinned an arm 196. The upper end of the arm 196 is provided with a handle 198 slidable in a cylindrical portion 200 of the arm and provided at its inner end with a pin 202 arranged to be received in one of a pair of recesses 204, one of which is shown in Fig. 7, in a plate 206 secured by screws 208 to the front wall 30 of the magazine. With the arm 196 in the position illustrated in Fig. 7 the gear segment 166 is connected to the lever 174 by the pin 172 so that upon operation of the cam shaft 130, the gates 134 will be opened and closed. However, if the handle 198 is retracted and the arm 196 swung in a counterclockwise direction as viewed in Fig. 7, the shaft 194 will be turned to rock the arm 192 in a direction to withdraw the pin 172 from engagement with the lever 174, the pin seating in a bore 210 in the bracket 170, thereby locking the gear segment 166 in the position shown in Fig. 7. Thus the gear segment is now disconnected from the lever 174 and the gates will remain closed during operation of the cam shaft 130 to enable loading of the magazine.

Figure 14:
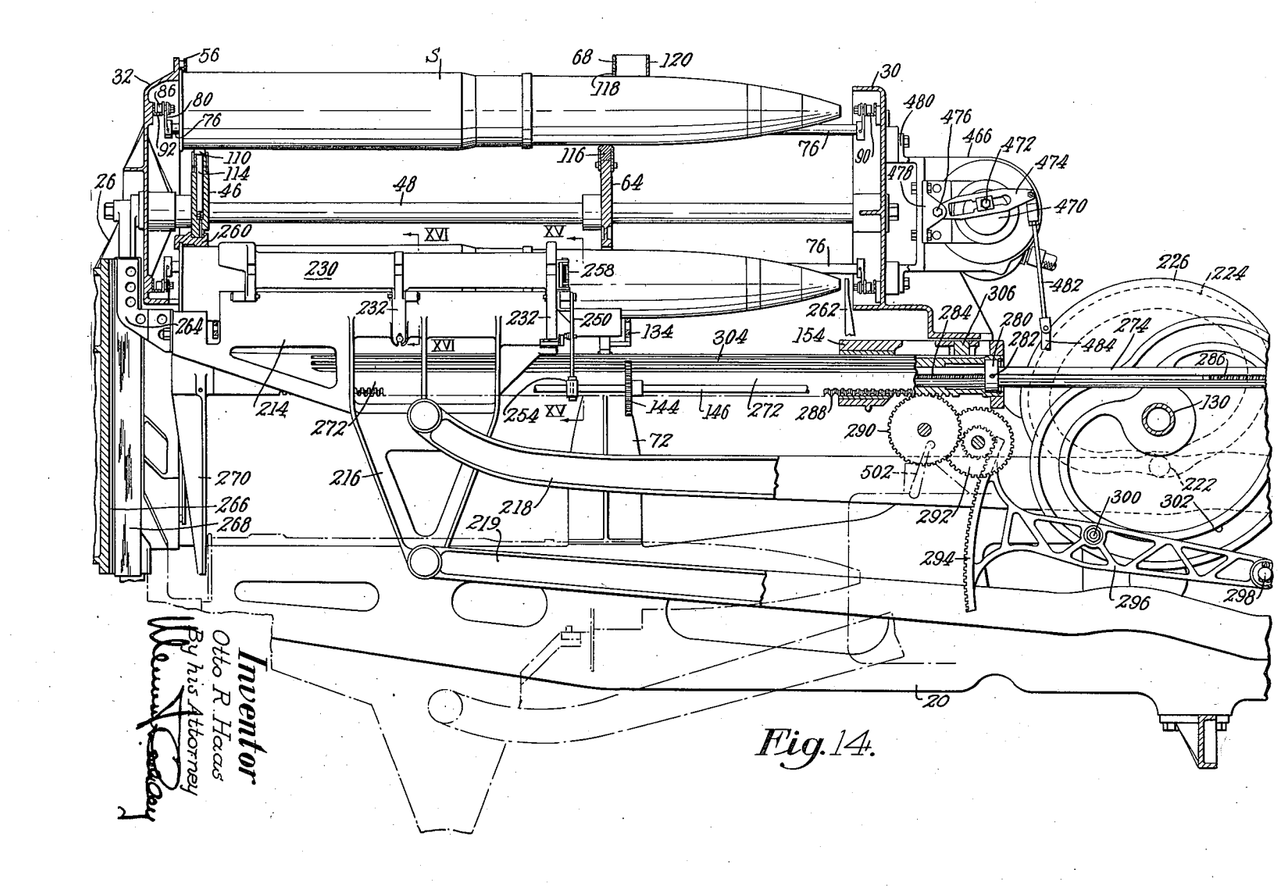
Fig. 14 is a vertical section through the magazine illustrating the shell transfer tray and the ramming mechanism.

The shells are removed from the magazine upon the opening of the gates 134 and carried into ramming position by a transfer tray 214 (Fig.

14), having a pair of downwardly extending brackets 216 to each of which is pivoted a pair of parallel links 218, 218 extending frowardly to the magazine and pivoted at 220 (Fig. 1) to the side frame members 20. The upper links 218 carry cam rolls 222 received in grooves 224 in cams 226 carried by the cam shaft 130 so that upon rotation of the cam shaft the transfer tray is moved downwardly into the broken line position shown in Fig. 14 in which the shell carried thereby is alined with the bore of the gun in position to be rammed thereinto.

Figure 15:
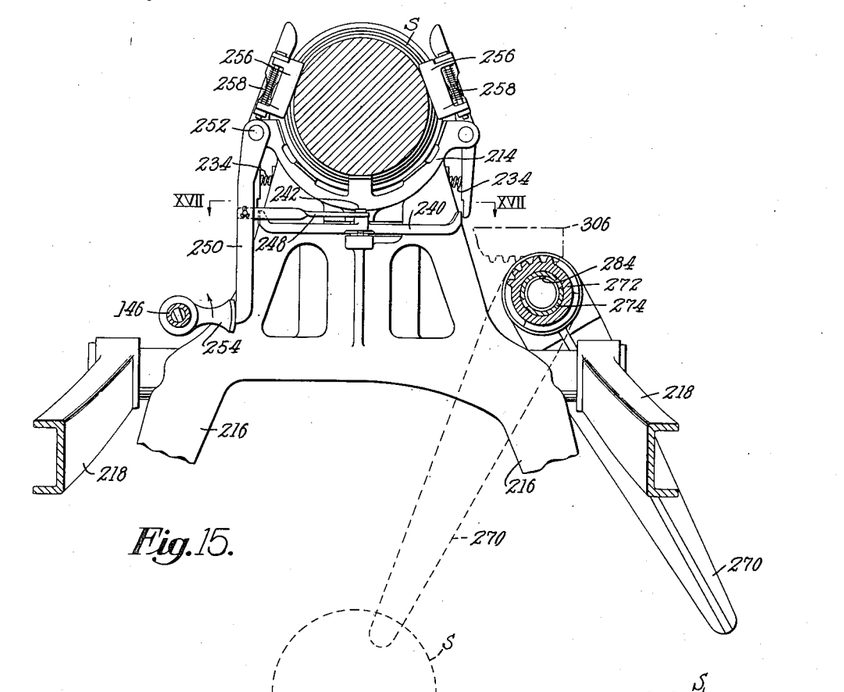
Fig. 15 is a section on the line XV—XV of Fig. 14.
Figure 16:
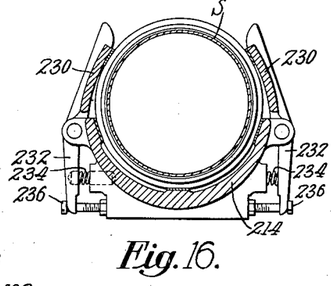
Fig. 16 is a section on the line XVI—XVI of Fig. 14.
Figure 17:
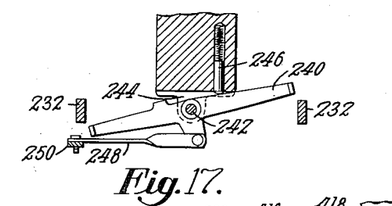
Fig. 17 is a section on the line XVII—XVII of Fig. 15.

Pivoted to opposite sides of the transfer tray is a pair of doors 230 arranged for engagement with the upper portion of the shell, when the shell is seated in the transfer tray as indicated in Fig. 16. Each of these doors has a downwardly extending arm 232 acted upon by compression spring 234 seated between the arm and the transfer tray for moving the doors inwardly into engagement with the shell. This movement of the doors is limited by stop screws 236 so that the doors will not close completely when no shell is in the transfer tray. The doors are held locked in the positions shown in Fig. 16 during downward movement of the tray to carry the shell in ramming position thereby to hold the shell securely therein. For this purpose a locking arm 240 (Figs. 15 and 17) is provided, the arm being pivoted on a pin 242 carried by a boss 244 on the under side of the transfer tray. This arm is normally held by a spring-pressed plunger 246 so that its outer ends lie between the downwardly projecting portions 232 of the doors 230. When in this position the locking arm prevents inward movement of these downwardly projecting portions of the doors and accordingly prevents opening of the doors against the force exerted by the springs 234. The arm 240 is moved into inoperative position as illustrated in Fig. 17 as the transfer tray moves upwardly into shell receiving position to permit opening of the doors in response to a force exerted thereon by engagement of the doors with a shell when the tray is moved into position to receive a shell as indicated in Figs. 14 and 16. For thus moving the arm 240 into inoperative position it is connected by a link 248 to a downwardly extending arm 250 the upper end of which is pivoted at 252 to the transfer tray 214. The lower end of the arm 250 lies in the path of movement of a cam 254 carried by the gates operating shaft 146. This cam occupies the position illustrated in Fig. 15 during upward movement of the transfer tray so that the lower end of the arm 250 is cammed inwardly causing the locking arm 240 to move into inoperative position as shown in Fig. 17 and permitting the doors to be opened by the shell against the force of the springs 234 to receive the shell at the release station. As the shaft 146 then rotates to open the gates 134 the cam 254 moves out of engagement with the lower end of the arm 250 whereupon the locking arm is moved into locking engagement with the depending portions 232 of the doors 230 so that these doors are locked and remain locked in the position shown in Fig. 16 during the subsequent descent of the transfer tray.

The forward portions of the doors 230 have pivoted thereto plates 256 urged by torsion springs 258 into engagement with the projectile, which is of smaller diameter than the cartridge case. These plates are permitted to open as the shell is moved forwardly from the tray during the ramming operation so that the larger diameter portion of the shell may pass therethrough. In order to hold the shell against axial movement in the magazine between the opening of the gates and the locking of the doors 230 of the transfer tray, the rim of the shell is received by a groove in a member 260 (Figs. 3 and 14) secured to the plate 46 at the rear of the magazine. Any forward movement of the shell in the transfer tray as it is being lowered into ramming position is limited by an upwardly extending plate 262 secured at its lower end to the transverse frame member 154. For guiding the transfer tray against sidewise movement during its vertical movements a rearwardly extending guide member 264 is secured to the rear portion of the tray and is received within a vertical groove 266 in the rear frame member 26 of the frame 18. The sides of the groove 266 are provided with spring steel members 268 to act upon opposite sides of the guide member 264 to steady it and the transfer tray against sidewise movement.

After the transfer tray has moved into the broken line position of Fig. 14 the shell is loaded in the gun by a rammer 270. This rammer is carried at the rearward end of a hollow shaft 272 telescopically mounted on a second hollow shaft 274 which is secured at its forward portion by a bracket 276 (Fig. 1) carried by the gun and at its rearward end to a bracket 278 (Fig. 2) carried by the rear frame member 26. The forward end of the rammer shaft 272 carries a collar 280 having a pin 282 passing through the shaft 274 and acting as an abutment for the forward end of a compression spring 284 in the hollow shaft 274, the rearward end of this spring acting against the bracket 278. With the shaft 272 in the position illustrated in Fig. 14, the spring 284 is compressed and thereby assists the driving mechanism in moving the rammer forwardly to load a shell. The forward portion of the supporting shaft 274 houses a second compression spring 286 which is engaged by the pin 282 and acts to soften the blow of the rammer during the latter portion of its ramming stroke.

For moving the rammer forwardly and rearwardly, the rammer shaft 272 is provided on its under side with rack teeth 288 engageable with a pinion 290 carried by the transverse frame member 154. This pinion is connected by stepup gearing 292 to a gear segment 294 on the rearward end of an arm 296 pivoted at 298 to one of the side frame members 20. This arm carries a cam roll 300 received by a groove 302 in one of the cams 226 on the cam shaft 130. At a predetermined time in the rotation of the cam shaft, the arm 296 is moved upwardly from the position shown in Fig. 14 thereby to move the rammer shaft 272 through the gears 292, pinion 290 and rack teeth 288, forwardly at a very high rate of speed to force the shell into the breech end of the gun.

Figure 9:
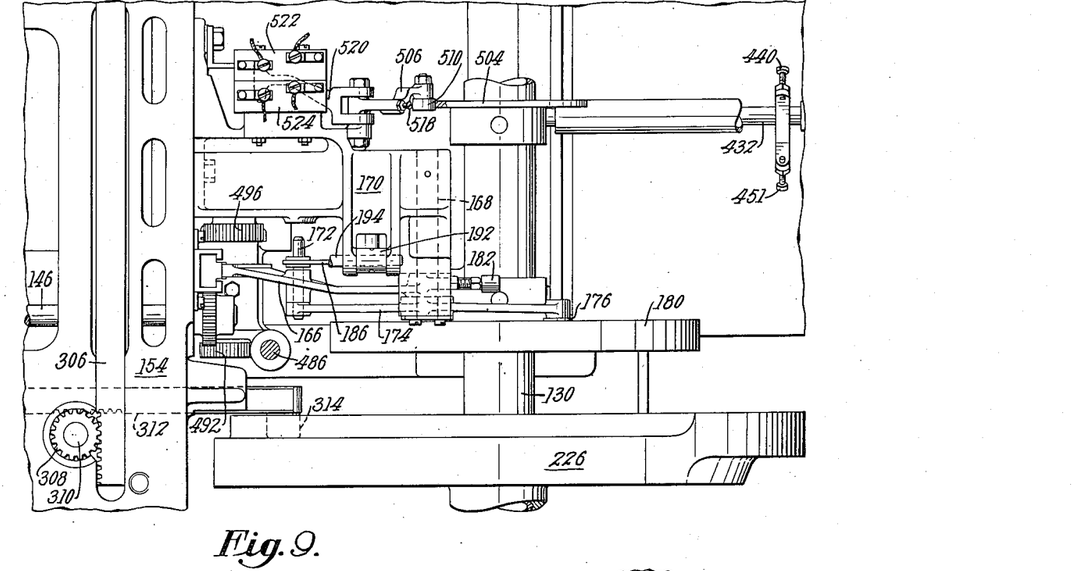
Fig. 9 is a plan view of a portion of the cam shaft illustrating certain of the mechanisms operated therefrom.
Figure 19:
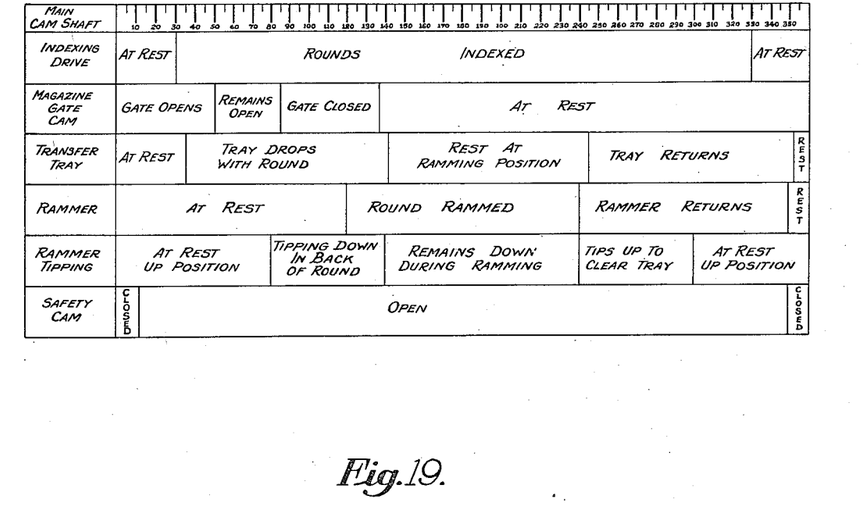
Fig. 19 is a timing chart illustrating the sequence of operations of the various mechanisms.

After the shell has been rammed, the rammer is returned into the position shown in Fig. 14 but during its return movement the transfer tray also moves upwardly as indicated by the cam chart in Fig. 19. In order to avoid interference between the tray and the rammer the shaft 272 is rocked on the supporting shaft 274 to tip the rammer 270 out of the path of movement of the tray. For this purpose splines 304 are formed in the upper surface of the shaft 272 and are arranged to be engaged by the teeth of a rack 306 extending transversely of the gun and received by a groove in the transverse frame member 154. The opposite end of this rack 306 has teeth cut on its vertical rearward face as shown in Fig. 9 for engagement with a pinion 308 carried by a vertically extending shaft 310. This pinion also engages teeth in a forwardly extending rack 312, carrying at its forward end a cam roll 314 received by a groove 315 in the face of one of the cams 226. This groove is so shaped as to operate the rack 312 immediately after the shell has been rammed into the gun thereby to tip the rammer arm 270 upwardly to clear the transfer tray and the arm remains in this position until after downward movement of the transfer tray has begun. During the latter part of this downward movement of the tray, the rammer arm is again tipped downwardly into operative position behind the shell as the next ramming operation begins.

The cam shaft 130 is driven by a motor 316 (Figs. 5 and 6) through a one revolution clutch mechanism 318. The motor is connected to the clutch by gears 320, 322, an overload clutch mechanism 324, a worm 326 and a worm gear 328 rotatable on the cam shaft. The over-load clutch 324 comprises a pair of toothed members normally held in engagement by a spring 330 which allows separation of the members in case of an over load to interrupt the drive to the clutch 318.

Figure 6:
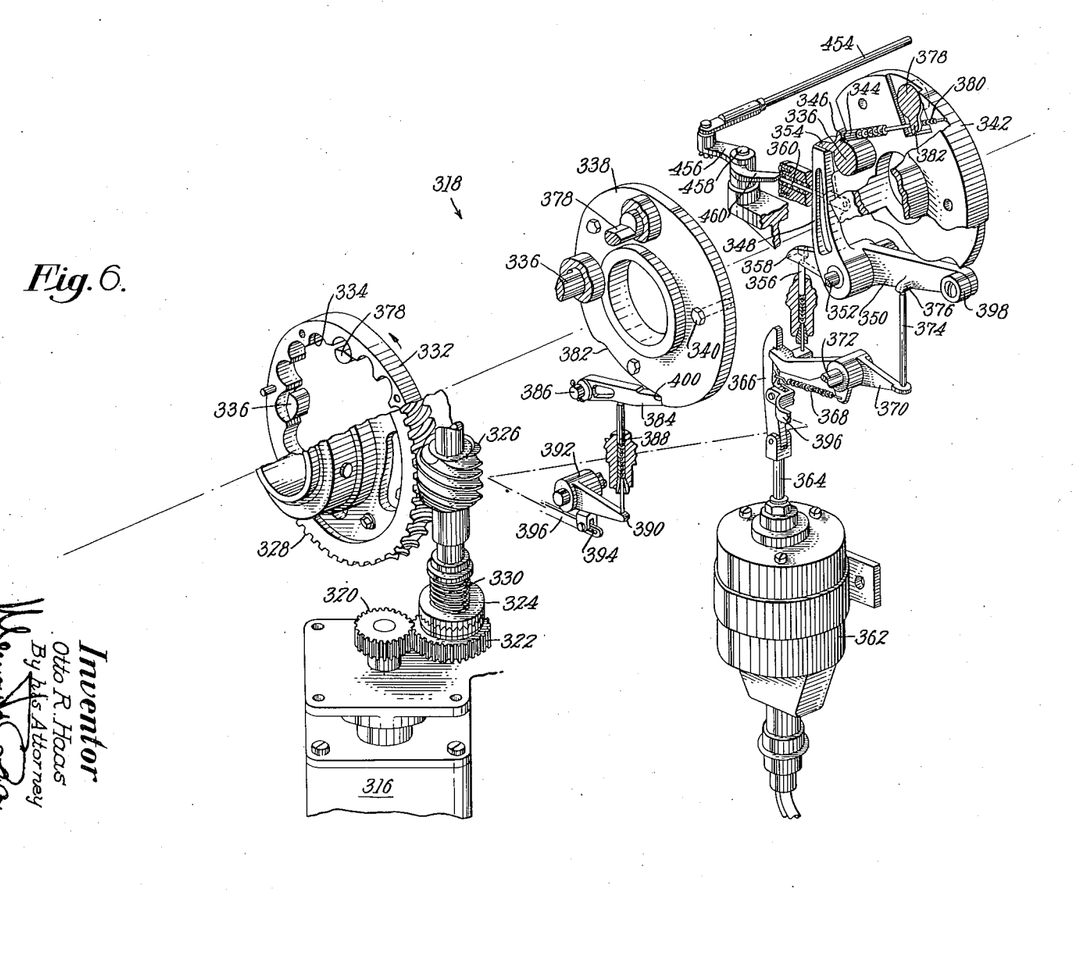
Fig. 6 is an exploded view of the mechanism for driving and controlling the cam shaft.

The clutch 318 comprises a driving member 332 secured to the worm gear 328 and provided with a plurality of circular recesses 334 adapted to receive a driving pin 336. This pin is rotatable in a carrier 338 secured by screws 340 to a cam 342 fast on the cam shaft. With the pin 336 in the position illustrated, the member 332 is free to rotate with respect to the carrier 338 so that no motion is imparted by the driving motor 316 to the cam shaft. If the pin is turned in a counterclockwise direction it will establish a drive between the member 332 and the carrier 338 to cause rotation of the cam shaft.

The pin 336 is normally urged into locking engagement with the member 332 by a spring-pressed plunger 344 carried by the cam 342, acting upon an upwardly extending ear 346 integral with the pin 336. With the cam shaft at rest, the pin 336 is maintained in the position illustrated against the force exerted by the plunger 344 by an upwardly extending arm 348 of a lever 350 pivoted at 352 in the clutch housing. The lever 350 is normally maintained in locking position with respect to the driving pin 336 with its upper end underlying an ear 354 of the driving pin by a spring-pressed plunger 356 acting on an arm 358 of the lever 350. A second spring-pressed plunger 360 acts on the arm 348 to assist in maintaining the lever 350 in its locking position.

For moving the lever 350 in a counterclockwise direction against the force exerted by the spring-pressed plungers 356 and 360 thereby to free the driving pin 336 for movement into driving position, a solenoid 362, secured to the housing of the clutch 318, is provided. This solenoid includes an armature 364 to the upper end of which is pivoted a latch 366 urged by a spring 368 into locking engagement with an arm 370 pivoted on a shaft 372 below the lever 350. A pin 374, supported on the outer end of the lever 370, underlies a laterally extending ear 376 carried by the lever 350 so that upon movement of the lever 370 in counterclockwise direction by the energization of the solenoid 362 the lever 350 will be moved in a counterclockwise direction to free the driving pin 336 for movement by the plunger into driving position thereby to effect movement of the cam shaft. Provision is made for preventing over running of the cam shaft which is possible with the conventional pin type clutch should the driven member be subjected to a force which might rotate it faster than the drive member. This might take place during the descent of the loading tray carrying a shell by reason of the influence of gravity thereon and in order to insure that the parts operate in a predetermined time relationship, a locking pin 378 journaled in the member 338 is provided. This pin is normally urged in a clockwise direction from the position illustrated by a compression spring 380 in the cam 342 acting upon a downwardly projecting ear 382 carried by the pin. With the drive pin 336 in its inoperative position the locking pin 378 is maintained in its inoperative position by a rearward extension of the spring-pressed plunger 344 engaging the ear 382 of the pin 378 opposite the spring 380. However, when the driving pin 336 is moved into driving position the plunger 344 moves toward the left as viewed in Fig. 6, thereby permitting movement of the locking pin 378 by the spring 380 into a position in which it prevents over running of the driven member.

In the event that the solenoid 362 is not de-energized after the cam shaft starts rotating, the latch 366 is moved out of engagement with the lever 370 in order to permit the arm 348 of the lever 350 to be moved into the path of movement of the ear 354 of the pin 336 to terminate operation of the cam shaft after one revolution. For this purpose the member 338 is provided with a cam surface 382 with which the end of an arm 384 pivoted at 386 is held in engagement by a spring-pressed plunger 388. The lower end of this plunger projects downwardly into engagement with an arm 390 of a bell crank 392 connected by a pin and slot connection 394 to a link 396 which is connected to the latch 366. After the cam shaft has rotated a small amount, the arm 384 is urged downwardly thereby causing movement of the bell crank lever 392 in a counterclockwise direction which operates through the link 396 to move the latch 366 against the force of the spring 368 out of engagement with the lever 370 which thereby permits return of the lever 350 to the position shown. Accordingly, after the cam shaft completes one revolution the ear 354 of the pin 336 engages the upper extremity of the arm 348 to throw the clutch out, even if the solenoid 362 has remained energized throughout this period.

The lever 350 carries a cam roll 398 engageable with a cam surface on the periphery of the cam 342, causing the lever 352 to be moved into its original position after the cam 342 has rotated a predetermined amount. Back lash of the driven member of the clutch, after it has been thrown out, is prevented by engagement of the arm 384 with a shoulder 400 in the member 338. At the end of the cycle of operations the arm 384 is moved by the spring-pressed plunger 388 into the position shown and reverse rotation of the member 338 is thus effectively prevented.

Figure 18:
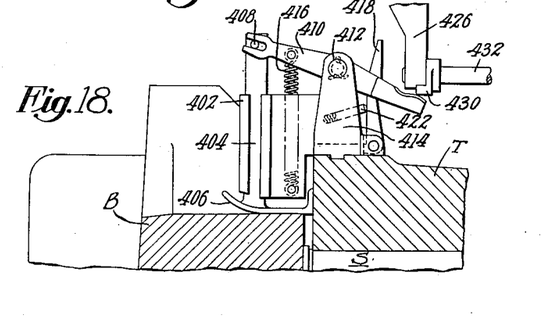
Fig. 18 is a vertical section through a portion of the breech and tube of the gun showing the mechanism associated therewith for controlling the operation of the breech switch.

In order that the operation of the loading mechanism cannot be initiated after the gun is fired until the gun has returned to battery, the breech has opened and the empty shell case ejected, provision is made for preventing energization of the solenoid 362 until these conditions have been fulfilled. Mounted for vertical sliding movement in a guideway 402 (Fig. 18), carried by the breech end of the gun tube T, is an arm 404 having at its lower end a feeler 406. The upper end of the arm 404 is connected by a pin and slot connection 408 to a lever 410 pivoted at 412 in a bracket 414 extending upwardly from the gun tube. A spring 416, connected between the lever 410 and the support for the guideway 402, urges the lever 410 in a counterclockwise direction thereby to move the feeler 406 downwardly. With the breechblock B closed as in Fig. 18, the feeler 406 rests thereon and thus cannot move downwardly. After the gun has been fired and the breechblock B opened, the feeler 406 may move downwardly but will engage the shell S if the shell has not been ejected from the breech. If the shell has been ejected, the feeler may move downwardly still further thereby to actuate a switch in the circuit of the solenoid as will be described. However, this movement of the feeler cannot take place unless the gun has been returned to battery. Until this time, lever 410 is held in the position illustrated by a latch 418 engageable with a pin 420 (Fig. 11) on the lever 410, the latch 418 being urged into locking position by a spring-pressed plunger 422. Upon return of the gun to battery this latch is moved rearwardly against the force of the plunger 422 by engagement of the latch with a stop screw 424 carried by a bracket 426 depending downwardly from the frame member 154, thereby moving the latch out of locking engagement with the pin on the lever 420.

Figure 12:
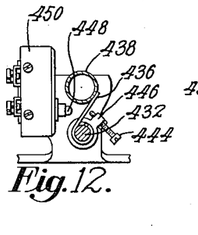
Fig. 12 is a section on the line XII—XII of Fig. 11.
Figure 13:
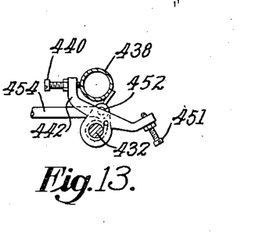
Fig. 13 is a section on the line XIII—XIII of Fig. 11.

With the gun returned to battery and the latch 418 released, the breechblock opened and the shell S ejected, the downward movement of the feeler 406 by the spring 416 causes the lever 410 to move in a counterclockwise direction, whereupon its forward portion engages an arm 430 (Fig. 18) carried by a shaft 432 journaled at its rearward end in the lower end of the bracket 426 and at its forward end in a bracket 434 (Fig. 11) extending upwardly from the gun carriage C which it will be understood remains stationary relatively to the breech and tube of the gun during firing. The shaft 432 is normally urged in a clockwise direction as viewed in Figs. 12 and 13 by a spring 436 engageable with a tube 438 carried by the gun carriage above the shaft 432. The position to which the shaft is moved by the spring 436 is determined by engagement of a stop screw 440 carried by an arm 442 movable with the shaft 432, with the tube 438. Upon movement of the shaft in a counterclockwise direction as heretofore described, a screw 444 carried by an arm 446 secured to the shaft 432 engages a switch button 448 thereby to close the circuit through a switch 450 carried by the bracket 434. This circuit must be closed before the solenoid 362 can be energized. Accordingly it will be obvious that the solenoid cannot be energized except when the gun is at battery with the breechblock open and the empty shell case ejected from the breech of the gun. Movement of the shaft in a counterclockwise direction by the lever 410 is limited by engagement of a screw 451 carried by the arm 442, with the tube 438.

The shaft 432 is also employed to prevent the lever 350 (Fig. 6) from moving to throw in the clutch unless the gun is in condition for loading. The shaft 432 carries an arm 452 (Fig. 11) extending upwardly and to which is secured one end of a link 454 the other end of which is connected to an arm 456 (Fig. 6) pivoted at 458 and having an extension 460 movable into engagement with the rear end of the spring-pressed plunger 360. With the shaft 432 in position shown in Figs. 11 to 13, the extension 460 of the arm 456 (Fig. 6) engages the spring-pressed plunger 360 thereby positively preventing the arm 348 from moving into position to free the driving pin 336 for movement into driving position. Thus it will be seen that until the gun is in condition for loading, the clutch 318 cannot be thrown in and the solenoid 362 cannot be energized. The controlling circuits for this solenoid will be explained in detail as the description proceeds.

The firing mechanism of the gun is actuated by a motor 464 (Figs. 5 and 7) which operates continuously during the operation of the gun and operates the firing mechanism through a one-revolution clutch mechanism 466. This clutch is controlled by a solenoid 468 which is energized as will be hereinafter described, upon depression of a firing button to throw in the clutch 466. This clutch operates a crank 470 to turn it through one revolution upon energization of the solenoid. The crank 470 includes a crank pin 472 (Fig. 14) slidable within a crank arm 474 pivoted at 476 to a bracket 478 secured to a base 480 by which the clutch 466 is connected to the front wall 30 of the magazine. The outer end of the arm 474 is connected through links 482 and 484 to the upper end of a rack 486 (Figs. 8 and 9) vertically movable in a housing 490 carried by the frame member 154. The rack 486 meshes with a pinion 492 mounted on one end of a shaft 494, the other end of which carries a pinion 496 (Fig. 9) which in turn meshes with a horizontally movable rack 498 (Fig. 8). The rearward end of this rack is provided with a head 500 arranged to engage and move a firing pin actuating arm 502 upon rearward movement of the rack during operation of the crank disk 470. The arm 502 actuates a conventional firing pin mechanism (not shown) to fire the gun.

Figures 10, 11:
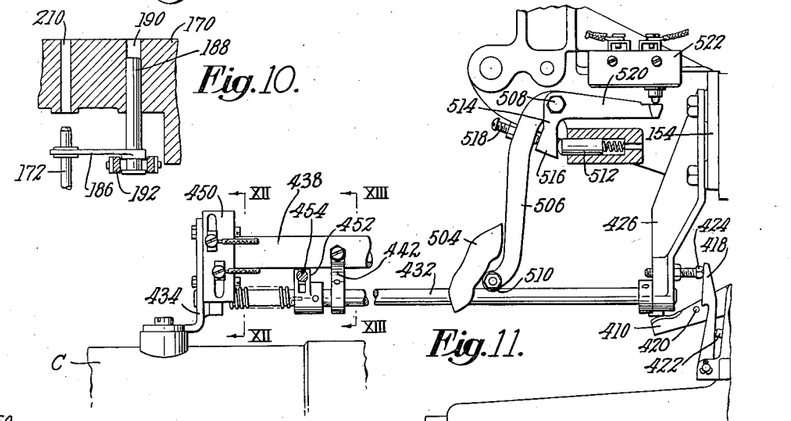
Fig. 10 is a section on the line X—X on Fig. 8.
Fig. 11 is a side elevation of the mechanism for operating the breech switch which prevents operation of the loading mechanism if the breech is closed, and of the mechanism for operating the switch which renders the firing mechanism inoperative during the loading operation.

During operation of the cam shaft 130 to index the shells in the magazine and to load a shell into the gun, the circuit to the solenoid 468 is opened so that the solenoid cannot be energized in the event that the firing button is prematurely actuated. This is effected by a cam 504 (Figs. 5, 8, 9 and 11) secured to the cam shaft 130. An arm 506 pivoted to the frame at 508 carries at its lower end a cam roll 510 which is maintained in engagement with the cam 504. This engagement is maintained by a spring-pressed plunger 512 which acts through a bell-crank lever 514 also pivoted at 508 to the frame. The bell-crank lever includes a depending arm 516 one side of which is in engagement with the plunger 512 and the other side of which engages an adjustable stop screw 518 carried by the arm 506. The bell-crank lever also includes an arm 520 arranged upon movement of the lever in a counterclockwise direction to open the circuits through a pair of switches 522 and 524 (Fig. 9). This movement of the bell-crank lever is effected during operation of the cam shaft during the indexing and loading operations, the cam roll 510 riding upon a high portion of the cam 504. The switches 522 and 524 are thus maintained open until the last portion of the operation of the cam shaft after the shell has been loaded in the gun, whereupon the cam roll 510 moves into the depression of the cam 504 as shown in Fig. 11, permitting the switches 522 and 524 to move into their normally closed positions. As will be hereinafter explained the switch 522 opens the circuit to the solenoid 468 of the firing mechanism and the switch 524 controls the operation of a pilot light to give a visual indication to the operator that the gun is loaded and is ready for firing.

*Operation*

Figure 20:
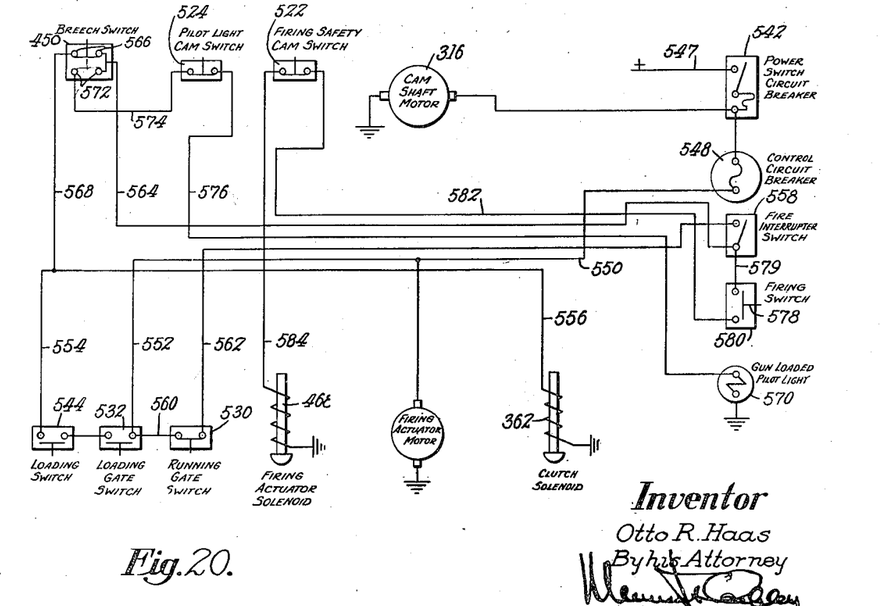
Fig. 20 is a wiring diagram of the electrical circuits for controlling the operation of the various mechanisms.

In describing the operation it will first be assumed that the magazine and gun are both empty of shells. Since it is first necessary to load the magazine the control arm 196 (Fig. 7) is moved in a counterclockwise direction, thereby to move the pin 172 (Figs. 9 and 10) out of engagement with the lever 174 to disconnect the lever from the gear segment 166 so that during the operation of the cam shaft the gates at the release station will not be opened. This movement of the arm 196 causes the opening of a switch 530 (Fig. 7) mounted on the front wall 30 of the magazine and the closing of a switch 532 mounted adjacent to the switch 530. For this purpose the arm 196 includes a lateral extension 534 connected by a link 536 to a lever 538 pivoted below the switches 530 and 532 and carrying screws 540 arranged selectively to close one or the other of the switches in accordance with the position of the arm 196. Referring now to Fig. 20 a main power switch 542 is closed to operate the cam shaft motor 316, a shell is placed in the magazine at the loading station by inserting the nose between the plates 64 and 68 (Fig. 14) and the rear end of the shell case upon the plunger 110, pressing down the plunger to permit the rim of the shell case to be inserted behind the plate 56. A loading switch 544 (Figs. 7 and 20) is now closed by depressing a button 546 thereby closing a circuit through the clutch solenoid 362 as follows: From a line wire 547 through the power switch 542, circuit breaker 548, wires 550, 552, loading gate switch 532 which is closed at this time, the switch 544, wires 554, 556 and solenoid 362 to ground. The energization of the solenoid throws in the one-revolution clutch 318 to cause the cam shaft to rotate through 360° to index the shell inserted at the loading station and move it one step in the magazine. Another shell is then inserted in the loading station and the operation repeated, this being done until the magazine is completely filled with shells. During this time the gun remains empty inasmuch as the loading gates are closed preventing the shells being transferred into ramming position by the transfer tray. With the magazine thus filled the arm 196 (Fig. 7) is moved into the position illustrated thereby opening the switch 532 and closing the switch 530. During the loading of the magazine and until such time as it is desired to fire the gun, a fire interrupter switch 558 (Fig. 20) is maintained open so that no shell is loaded into the gun. As soon as this switch is closed a circuit through the clutch solenoid 362 is established as follows: Through wires 547, 550, 552, 560, switch 530 which is now closed, wire 562, switch 558, wire 564, the contacts 566 of the breech switch 450 which is in the position illustrated when the breechblock is open and the gun is not loaded, wires 568 and 556 through solenoid 362 to ground. Thus it will be seen that as soon as the fire interrupter switch is closed after the loading operation, the solenoid 362 is energized causing one revolution of the cam shaft and causing a shell to be loaded into the gun as heretofore described, it being understood that at this time the gear segment 166 (Fig. 9) is connected to the lever 174 operated by the cam 180, to cause opening of the gates at the release station. The gun is now loaded and ready to fire. An indication of this is imparted to the gunner by a pilot light 570 a circuit through which is established as follows: From line wire 547 through wires 550, 552, 560, switch 530, wire 562, switch 558, wire 564, contacts 572 of the breech switch which are now closed by the automatic closing of the breechblock after the shell has been loaded, wire 574, the cam operated switch 524 and wire 576 through the pilot light 570 to ground. This light gives an indication to the gunner the gun is loaded and ready to be fired and the firing is effected by depressing a button 578 of a firing switch 580. This establishes a circuit through the firing actuator solenoid 468 as follows: From line wire 547 through wires 550, 552, 560, switch 530, wire 562, switch 558, wire 579, switch 573, wire 582, cam operated switch 522 and wire 584 through the solenoid 468 to ground. The energization of this solenoid actuates the firing mechanism and the gun is fired. Following firing of the gun the breechblock is opened and the shell ejected in the conventional manner whereupon the breech switch 450 moves into the position illustrated in Fig. 20 in which the contacts 566 are closed. Accordingly a circuit through the clutch solenoid 362, including the switch 558 which is now closed, is established as heretofore described causing the magazine to index another shell to be loaded in the gun. During this time the switch 522 is opened by the cam 504 so that the firing mechanism will not be actuated prematurely in the event that gunner should inadvertently close the firing switch 580. In the event that the shell, after firing, should not be properly ejected from the gun, the breech switch will not move into the position illustrated in Fig. 19 and no circuit will be established through the clutch solenoid 362 so that the mechanism will not attempt to load a shell into the gun unless the gun has been properly emptied of the previously fired shell case. Should it be desired to have the gun remain empty following the firing of the shell as may be the case following destruction of the target and return of the plane to its base before all the shells have been used, the fire interrupter switch 558 would be opened so that after the shell in the gun is fired and the breech switch 450 moves into the position shown, no circuit through the clutch solenoid will be established.

The magazine per se is not claimed herein but forms the subject-matter of divisional application Serial No. 688,523, filed August 5, 1946.

Having thus described the invention, what I claim as new and desire to secure by Letters Patent of the United States is:

1. Gun-loading mechanism comprising a shell magazine, means for indexing shells step by step in the magazine to a release station in the lower part thereof, a transfer tray movable to carry a shell from a shell-receiving position at the release station into a ramming position from which the shell may be rammed into the gun, a retractable gate for permitting movement of the shell from the magazine by said transfer tray, a cam shaft for operating said gate, said indexing means and said transfer tray in a predetermined time sequence, and means for disconnecting said gate-operating mechanism from said cam shaft to prevent removal of the shells from the magazine by the transfer tray during a magazine-loading operation.

2. Gun-loading mechanism comprising a shell magazine, means for indexing shells step by step in the magazine to a release station and loading them into a gun, means operative automatically in response to ejection of the empty shell case following a firing operation for operating said first named means, manually operable means for operating said first named means, and means placing such first named means selectively under the control of said automatically operated means or said manually operated means.

3. Gun-loading mechanism comprising a shell magazine, means for indexing shells step by step in the magazine to a release station and loading them into a gun, means operative automatically in response to ejection of the empty shell case following a firing operation for operating said first named means, manually operable means for also operating said first named means, means placing said first named means selectively under the control of said automatically operated means or said manually operated means, and means preventing withdrawal of shells from the magazine at the release station when the first named means is under the control of the manually operated means.

4. Gun-loading mechanism comprising a shell magazine, means for indexing shells step by step in the magazine to a release station, means for withdrawing shells from the release station and loading them into a gun, means operable automatically in response to ejection of the empty shell case following a firing operation for operating said first named means, manually operable means for operating said first named means, means for rendering said withdrawing means ineffective to withdraw shells from the release station, and means operative in response to operation of said last named means for placing said first named means under the control of said manually operable means.

5. Gun-loading mechanism comprising a shell magazine, means for indexing shells step by step in the magazine to a release station, gates at said release station for controlling the removal of shells from the magazine, a transfer tray for transporting shells from the release station into ramming position, a rammer for loading the shells into the gun, a drive shaft for operating said indexing means, gates, transfer tray and rammer in a predetermined sequence, and means for disconnecting the gates from the drive shaft to prevent removal of the shells from the magazine during the loading of the magazine.

6. Gun-loading mechanism comprising a shell magazine, means for indexing shells step by step in the magazine to a release station, gates at said release station for controlling the removal of shells from the magazine, a transfer tray for transporting shells from the release station into ramming position, a rammer for loading the shells into a gun, a drive shaft for operating said indexing means, gates, transfer tray and rammer in a predetermined sequence, a drive motor, a one-revolution clutch connecting said motor and said drive shaft, and means operative in response to ejection of a fired shell from the gun for operating said clutch to connect said drive shaft to said motor.

7. Gun-loading mechanism comprising a shell magazine, means for indexing shells step by step in the magazine to a release station, gates at said release station for controlling the removal of shells from the magazine, a transfer tray for transporting shells from the release station into ramming position, a rammer for loading the shells into a gun, a drive shaft for operating said indexing means, gates, transfer tray and rammer in a predetermined sequence, a drive motor, a one-revolution clutch connecting said motor and said drive shaft, means operative in response to ejection of a fired shell from the gun for operating said clutch to connect said drive shaft to said motor, means for disconnecting said gates from said drive shaft to prevent removal of shells from the magazine during the loading thereof and simultaneously rendering said last named means inoperative, and manually controlled means for operating said clutch during loading of the magazine.

8. Loading mechanism for a gun having a breech block comprising a drive shaft, means operated by the drive shaft for loading shells into a gun, electrically operated means for causing operation of said drive shaft, a switch normally closing a circuit to said electrically operated means, and means associated with the breech end of the gun for maintaining said switch open as long as the breechblock is closed or a shell is in the gun.

9. Loading mechanism for a gun having a breechblock comprising a shell magazine, means for indexing shells step by step to a release station in the magazine, means for removing a shell from the magazine at the release station and loading it into the gun, a drive shaft for operating said indexing means and said loading means, electrically operated means for causing operation of said drive shaft, a switch normally closing a circuit to said electrically operated means, and means associated with the breech end of the gun for maintaining said switch open as long as the breechblock is closed or a shell is in the gun.

10. Loading mechanism for a gun having a breechblock comprising a shell magazine, means for indexing shells step by step to a release station in the magazine, means for freeing a shell for removal at the release station, means for removing a freed shell from the magazine at the release station and loading it into the gun, a drive shaft for operating said indexing means and said loading means, electrically operated means for causing operation of said drive shaft, a switch normally closing a circuit to said electrically operated means, means associated with the breech end of the gun for maintaining said switch open as long as the breechblock is closed or a shell is in the gun, means for disconnecting said shell-freeing means from the drive shaft, means operative in response to operation of said disconnecting means for rendering said switch ineffective to close the circuit to said electrically operated means, and a manually controlled means for said electrically operated means while the shell-freeing means is disconnected from the drive shaft.

11. Gun-loading mechanism comprising a shell magazine, a transfer tray for transporting shells from the magazine into ramming position, said transfer tray being provided with a pair of doors arranged for engagement with opposite sides of a shell, means urging said doors into shell-engaging positions, and means for locking said doors in shell-engaging position after a shell has been received by the tray and prior to movement of the tray to carry the shell into ramming position.

12. Gun-loading mechanism comprising a shell magazine, means for indexing shells step by step to a release station in the magazine, a retractable gate for permitting removal of a shell from the magazine at the release station, a transfer tray for transporting shells from the release station of the magazine into ramming position, said transfer tray being provided with a pair of doors arranged for engagement with opposite sides of a shell, means urging said doors into shell-engaging positions, means for retracting said gate upon movement of the tray into shell-receiving position, and means for simultaneously locking said doors in shell-engaging positions.

13. Gun-loading mechanism comprising a shell magazine, means for indexing shells step by step to a release station in the magazine, a retractable gate for permitting removal of a shell from the magazine at the release station, a transfer tray for transporting shells from the release station of the magazine into ramming position, said transfer tray being provided with a pair of doors arranged for engagement with opposite sides of a shell, means urging said doors into shell-engaging positions, means for retracting said gates upon movement of the tray into shell-receiving position, means for simultaneously locking said doors in shell-engaging positions, and means for rendering said gate-retracting and door-locking means inoperative, to enable loading of the magazine without moving the shells therefrom.

OTTO R. HAAS.

REFERENCES CITED

The following references are of record in the file of this patent:

UNITED STATES PATENTS

| Number | Name | Date |
|---|---|---|
| 601,839 | McClean | Apr. 5, 1898 |
| 851,196 | Bevans et al. | Apr. 23, 1907 |
| 1,008,162 | Krnka | Nov. 7, 1911 |
| 1,099,621 | Schildbach | June 4, 1914 |
| 1,273,078 | McManus | July 16, 1918 |
| 1,602,570 | Conlon | Oct. 12, 1926 |
| 1,749,137 | Hudson | Mar. 4, 1930 |
| 1,750,724 | Methlin | Mar. 18, 1930 |
| 1,782,148 | Ross | Nov. 18, 1930 |
| 1,786,207 | Hudson | Dec. 23, 1930 |
| 1,811,694 | Larsson et al. | June 23, 1931 |
| 2,112,660 | Hudson | Mar. 29, 1938 |
| 2,122,423 | Joyce | July 5, 1938 |
| 2,151,288 | Waninger | Mar. 21, 1939 |
| 2,322,490 | Webb | June 22, 1943 |
| 2,339,869 | Martin | Jan. 25, 1944 |
| 2,359,517 | Gebeau | Oct. 3, 1944 |
| 2,366,395 | Hall | Jan. 2, 1945 |
| 2,369,244 | Lowe | Feb. 13, 1945 |
| 2,380,455 | Lippert et al. | July 31, 1945 |

FOREIGN PATENTS

| Number | Country | Date |
|---|---|---|
| 20,009 | Great Britain | 1913 |
| 384,239 | Great Britain | Dec. 1, 1932 |
| 491,337 | Great Britain | Aug. 22, 1938 |
| 122,587 | Austria | Apr. 25, 1931 |